United States Patent [19]

Weldes

[11] 3,941,723

[45] Mar. 2, 1976

[54] CRYSTALLIZED ALKALI METAL SILICATE WITH SEQUESTERING AGENTS

[75] Inventor: Helmut H. Weldes, Havertown, Pa.

[73] Assignee: Philadelphia Quartz Company, Valley Forge, Pa.

[22] Filed: May 14, 1971

[21] Appl. No.: 143,626

[52] U.S. Cl............ 252/527; 23/301 R; 23/301 SP; 23/302 R; 252/135; 252/539; 252/DIG. 11
[51] Int. Cl.². B01J 17/06; B01J 17/20; C11D 7/14; C11D 7/32
[58] Field of Search ...... 252/99, 135, 527, DIG. 11; 23/300, 301, 302

[56] References Cited
UNITED STATES PATENTS

| | | | |
|---|---|---|---|
| 2,333,443 | 11/1943 | Robinson | 252/135 |
| 3,285,859 | 11/1966 | Jelen | 252/385 |
| 3,377,134 | 4/1968 | Baker et al. | 23/301 R |
| 3,544,473 | 12/1970 | Kitchen et al. | 252/99 |
| 3,579,299 | 5/1971 | Sams et al. | 23/110 A |
| 3,630,923 | 12/1971 | Simmons et al. | 252/99 |
| 3,701,735 | 10/1972 | Finck | 252/99 |

*Primary Examiner*—Dennis L. Albrecht
*Attorney, Agent, or Firm*—Fred Philpitt; Ernest Posner

[57] ABSTRACT

Composite crystals of alkali metal silicate, particularly hydrated sodium metasilicates such as sodium metasilicate pentahydrate with sequestering agents, are formed by co-crystallization of liquors that contain both alkali metal silicate and sequestering agents.

5 Claims, No Drawings

CRYSTALLIZED ALKALI METAL SILICATE WITH SEQUESTERING AGENTS

INTRODUCTION

Sequestering agents have been added to detergents and cleaners to enhance performance, or to allow reduction or replacement of phosphates. It has been found that phosphates in detergents and cleaners may be injurious to the environment and the levels of phosphate in detergents and cleaners should be reduced or even eliminated. Therefore, a greater variety of sequestering agents must be considered for use in these products. Most currently available sequestering agents are very small in particle size and are inconvenient in storage, handling and processing: they cake, are subject to dusting and form lumps when in contact with moisture or liquid components of detergent slurries. Many other sequestering agents are available as solutions of 40 to 60% so that they have limited usefulness.

Crystalline alkali metal silicates, especially sodium metasilicate pentahydrate, have been added to detergents and cleaners to provide builder properties and corrosion protection. The preparation of such crystals is usually accomplished by preparing a liquor having substantially the same composition as the desired crystalline species and then crystallizing the liquor. These liquors are very viscous and are easily supercooled without any crystallization taking place. The methods used to initiate crystallization include seeding, crutching, cooling and other known methods of inducing crystallization. Even though these methods are employed the crystallization is slow to start and a large amount of fine seed particles must be used so that a large amount of material must be recycled and the production of product is reduced. The crystallized products produced as sheets or cakes are difficult to granulate because of the extreme hardness of crystallized material. The intense grinding needed adds impurities and the product may be dusty. Also such difficulty in grinding tends to form particles that cake.

I have found a method for producing composites of sodium metasilicate pentahydrate and sequestering agents which do not have the disadvantages that the individual components exhibit. The method involves preparing a liquor that contains sodium metasilicate and the sequestering agent in the proper ratio and concentration and crystallizing the liquor. This system does not supercool as readily as the metasilicate liquors and the crystallization is much easier to initiate. Therefore, the quantity of seed needed can be limited to the fines generated in processing that would have to be recycled in any case. A further advantage is realized because the crystallized cakes or sheets easily crush to granules so that impurity levels derived from the granulating equipment are very low and the tendency to cake is low. The granules realized from this process have a good particle size, are free-flowing and are easily handled.

THE INVENTION

The sequestering agents used in this invention can be any chemical or chemicals capable of reducing the activity of metal ions in solution and maintaining the ions in solution. The most important of such metal ions are $Ca^{++}$ and $Mg^{++}$ which precipitate soap and silicates, decrease the efficiency of surfactants and in general, are responsible for the reactions of hard water. Many chemicals reduce the activity of the metal ions in solution but do not maintain the ions in solution while the agents employed in this invention achieve both functions. Such agents include the sodium or potassium salts of the following organic acids: nitrilotriacetic acid, ethylenediaminetetraacetic acid, diethylenetriaminepentaacetic acid and citric acid. Other useful materials are sodium gluconate, sodium glucoheptonate, sodium boroglucoheptonate and disodium oxydiacetate. Other useful materials include polyelectrolytes such as polyacrylamide, modified starches and polyols such as Pluronics. These materials can be used as solids or concentrated solutions depending on the availability of the agent and on the concentration of the liquor to be prepared.

The alkali metal silicate liquors with which the sequestering agents are combined usually have $M_2O:SiO_2$ mole ratios of 0.96:1.0 to 2.3:1.0 and have solids contents of 30% to a near anhydrous condition. M stands for an alkali metal. A sodium metasilicate pentahydrate would have a mole ratio of $Na_2O:SiO_2:H_2O$ of 1.0:1.0:5.0 and the solids content would be 57%. These ratios can be varied somewhat and useful products still result. Such liquors are usually prepared by blending a more siliceous alkali metal silicate solution with alkali metal hydroxide solution. The silicate liquor can be prepared at the concentration needed for crystallization so that no further processing steps are needed or an anhydrous sequestering agent that hydrates can be added to take up any excess water. The sequestering agents can also be added as a solution containing its own water of hydration if it does hydrate. In some cases, of course, the sequestering agent does not hydrate. The ratio of sequestering agent solids to silicate solids can be up to 2.5:1.0.

The mixture of sequestering agent and sodium metasilicate liquor is now ready to crystallize. If the sequestering agent is added as a solid no additional seed particles may be needed but if the sequestering agent is added as a solution or dissolves completely in the silicate liquor, seed particles must be added. These can be recycled fines or fine sodium metasilicate pentahydrate crystals. The seeded combination-liquor can be cost in a sheet or in a mold and crystallization allowed to take place. The crystallization takes place rapidly, in fact much more rapidly than when just sodium metasilicate pentahydrate is crystallized. As the crystallization proceeds the temperature of the material rises because of the heat of crystallization but the temperature rise is reduced from that of plain sodium metasilicate pentahydrate.

The resulting product is easily crushed to form a granular product which is free-flowing and non-caking. Because the materials are easily crushed the insoluble pick-up is very slight and the material is not dusty since very few fine particles are produced. This ease of grinding is quite in contrast to that of straight crystallized silicates which are very hard and must be vigorously ground. This is illustrated by the fact that a crystallized sodium metasilicate pentahydrate must be passed through a jaw crusher 5 or more times to reduce it to the same particle size as a sodium metasilicate pentahydrate with 25% sodium citrate which was passed through the jaw crusher twice. The products have a white apperance with a bulk density of 40 to 70 lbs/cu.ft. The dissolving rate is very fast and the insoluble content is very low.

These products are quite useful especially in cleaning compounds. Hard surface cleaners with excellent cleaning power can be produced containing substantial amounts of these products.

EXAMPLES

The following examples are illustrative of embodiments of the invention. It should be understood that these examples are not intended to limit the invention and that obvious changes may be made by those skilled in the art without changing the essential characteristics and the basic concept of the invention. The parts and percentages are by weight and the mesh sizes refer to Tyler standard screen-scale sieves.

EXAMPLE 1

A sodium metasilicate pentahydrate liquor was prepared by blending a sodium silicate solution with an $SiO_2/Na_2O$ ratio of 3.22 with caustic solution. The mole ratio of $Na_2O$: $O:SiO_2:H_2O$ of the liquor was 0.99:1.00:4.97 and the liquor was maintained at 75°C to prevent any crystallization until the test was started. The liquor (97.5 pbw) was cooled to 70°C and 2.5 pbw of seed particles were added. The seed was less than 200 mesh and had a composition similar to the liquor. The temperature of the liquor fell until the crystallization began. The crystallization began after about 45 minutes and continued for about 60 minutes until the cake was hard to the touch. Evolution of heat of crystallization continued for about 30 minutes more. The cake was allowed to equilibrate for 60 minutes and then ground in a jaw crusher. The total processing time prior to crushing was 3 hours and 15 minutes. The cake and resulting material had to be passed through the jaw crusher 6 times before all of the material was reduced to below 20 mesh. In the process a large percentage of fines were produced and the product was dusty. The product contained about 1.5% iron.

EXAMPLE 2

The liquor of Example 1 (90 pbw) was cooled to 55°C and 10 pbw of the seed of Example 1 added. The crystallization began after about 5 minutes and continued for about 35 minutes until the cake was hard to the touch. The heat of crystallization continued for about 15 minutes more. The cake was allowed to equilibrate for 60 minutes and then ground in a jaw crusher. The total processing time prior to crushing was 1 hour and 55 minutes. The cake and resulting material had to be passed through the jaw crusher 5 times before all the material was reduced below 20 mesh. In this process a large percentage of fines were produced and the product was dusty.

EXAMPLE 3

The liquor of Example 1 (90 pbw) was cooled to 60°C and 90 pbw of solid sodium glucoheptonate dihydrate ($NaGH.2H_2O$) was added. The $NaGH.2H_2O$ was in the form of small crystals that were smaller than 100 mesh. After about 5 minutes the crystallization began and continued for 25 minutes until the cake was solid to the touch. The heat of crystallization continued for about 15 minutes more. It was found that the cake needed to equilibrate for only 30 minutes before jaw crushing. The total processing time before crushing was 75 minutes. Two passes through the jaw crusher were needed to reduce the cake to particles of less than 20 mesh. Few fines were produced so that the product was not dusty and the iron content was less than 0.3%. The ratio of NaGH solids to metasilicate solids was 1.56:1.00 on a weight basis and the water content was 27.8%.

EXAMPLE 4

The liquor of Example 1 (90 pbw) was cooled to 60°C and 45 pbw of sodium nitrilotriacetic acid monohydrate ($SNTA.H_2O$) was added. The $SNTA.H_2O$ was in the form of small crystals that were smaller than 65 mesh. After 5 minutes the crystallization began and continued for 30 minutes until the cake was solid to the touch. The heat of crystallization continued for about 25 minutes more. It was found that the cake needed to equilibrate for only 30 minutes before jaw crushing. The total processing time before crushing was 90 minutes. Two passes through the jaw crusher were needed to reduce the cake to particles of less than 20 mesh. Few fines were produced so that the product was not dusty and the iron content was less than 0.3%. The ratio of SNTA solids to metasilicate solids was 0.82:1.00 on a weight basis and the water content was 30.8%.

EXAMPLE 5

$SNTA.H_2O$ (25 pbw) was dissolved in 90 pbw of the liquor of Example 1 stirring at 75°C. The mixture was cooled to 60°C and seeded with 2.5 pbw of the SNTA-metasilicate composite of example 4 that had been crushed to particles that were less than 100 mesh. After about 5 minutes the crystallization began and continued for 30 minutes until the cake was solid to the touch. The heat of crystallization continued for 17 minutes more. It was found that the cake needed to equilibrate for only 30 minutes before jaw crushing. The total processing time before crushing was 82 minutes. Two passes through the jaw crusher were needed to reduce the cake to particles of less than 20 mesh. Few fines were produced so that the product was not dusty and the iron content was less than 0.3%. The ratio of SNTA solids to metasilicate solids was 0.46:1.00 on a weight basis and the water content was 38.0%.

EXAMPLE 6

A hard surface cleaner was prepared using the product of Example 5. The composition of the cleaner was:

| | |
|---|---|
| Triton N-101 (Nonionic surfactant, Rohm and Haas Corp) | 0.5 pbw |
| Nacconol 40-DB (Anionic surfactant, GAF Corp) | 1.5 |
| SNTA-Sodium Metasilicate Composite of Example 5 | 98.0 |

The mixture was blended easily and the product was not dusty. The material was an excellent cleaner in hard water for hard surfaces such as cement floors, etc.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the compositon unsuitable for the disclosed purposes. Therefore, this application for Letters Patent is intended to cover all such modifications, changes and substitutions as would reasonably fall within the scope of the appended claims.

What I claim is:

1. A process for the production of free flowing, non-caking readily soluble granules comprising the steps of
   a. preparing an alkali metal silicate liquor having an $M_2O:SiO_2$ mole ratio of 0.96 to 2.3:1.0 and a solids content of at least 30%,
   b. introducing a sequestering agent of particle size less than 65 mesh into said silicate liquor, the ratio of said sequestering agent solids to alkali metal silicate solids being up to 2.5:1.0 and selected from the group consisting of sodium salts of organic amino acids, potassium salts of organic amino acids sodium salts of organic hydroxy acids, potassium salts of organic hydroxy acids, sodium salts of organic polyhydroxy acids, potassium salts of organic polyhydroxy acids,
   c. crystallizing the resultant solution to obtain an easily crushable cake,
   d. crushing said cake to obtain the desired granules.

2. The process of claim 1 in which the sequestering agent is added in a crystalline form and acts as seed to initiate the crystallization.

3. The process of claim 1 in which the sequestering agent is dissolved in the alkali metal silicate liquor and fines of previously prepared granules are recycled for seed.

4. The process of claim 1 wherein the sequestering agent is selected from the group consisting of sodium nitrilotriacetic acid, potassium nitrilotriacetic acid, sodium ethylenediaminetetraacetic acid, potassium ethylenediaminetetraacetic acid, sodium diethylenetriaminepentaacetic acid, potassium diethylenetriaminepentaacetic acid, sodium citrate, potassium citrate, sodium gluconate, sodium glucoheptonate, sodium boroglucoheptonate and disodium oxydiacetate.

5. The process of claim 1 wherein the ratio of sequestering agent solids to alkali metal silicate solids is 0.46:1.0 up to 2.5:1.0 and wherein said sequestering agent is selected from the group consisting of sodium nitrilotriacetic acid, potassium nitrilotriacetic acid and sodium glucoheptonate.

* * * * *